(12) United States Patent
De Samber et al.

(10) Patent No.: US 7,714,835 B2
(45) Date of Patent: May 11, 2010

(54) OPTO-ELECTRONIC INPUT DEVICE, METHOD OF MANUFACTURING SUCH A DEVICE AND METHOD OF MEASURING THE MOVEMENT OF AN OBJECT BY MEANS OF SUCH A DEVICE

(75) Inventors: Marc Andre De Samber, Eindhoven (NL); Roger A. Vranken, Eindhoven (NL); Johannus Wilhelmus Weekamp, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 836 days.

(21) Appl. No.: 10/558,719
(22) PCT Filed: May 24, 2004
(86) PCT No.: PCT/IB2004/050760
§ 371 (c)(1),
(2), (4) Date: Nov. 29, 2005
(87) PCT Pub. No.: WO2004/107147
PCT Pub. Date: Dec. 9, 2004

(65) Prior Publication Data
US 2007/0002010 A1 Jan. 4, 2007

(30) Foreign Application Priority Data
Jun. 2, 2003 (EP) .................................. 03101586

(51) Int. Cl.
*G09G 5/00* (2006.01)
(52) U.S. Cl. .................. 345/156; 345/165; 345/166
(58) Field of Classification Search ......... 345/156–158, 345/184, 163, 165–166
See application file for complete search history.

(56) References Cited

U.S. PATENT DOCUMENTS
5,909,210 A 6/1999 Knox et al.

(Continued)

FOREIGN PATENT DOCUMENTS
DE 10001619 A1 7/2001

(Continued)

OTHER PUBLICATIONS

International Search Report of International Application No. PCT/IB2004/050760 Contained in International Publication No. WO2004107147.
Written Opinion of the International Searching Authority for International Application No. PCT/IB2004/050760.

*Primary Examiner*—Alexander Eisen
*Assistant Examiner*—Christopher E Leiby

(57) ABSTRACT

The invention relates to an opto-electronic input device (10), wherein the input is formed by detected movements of an object (M), which opto-electronic input device is provided with an optical module (11) comprising at least one laser (1) mounted on a carrier plate (4), which laser emits a radiation beam (S) that is guided to a plate (V) close to the object (M) and, after reflection therefrom, causes a change in the resonant cavity of the laser (1) which is representative of the movement of the object (M), and which is measured within the module (11). According to the invention, the plate (V) close to the object (M) comprises, within a projection of the object (M), a first portion (VI) through which the beam (S) can pass and which has a fixed position with respect to the carrier plate (4), and a second portion (V2) which is movable in a direction perpendicular to the carrier plate (4) and which comprises signal means which, when they are moved, provide a signal that is observable by a user of the device (10). In this way, the device (10) provides feedback to a human user through his tactile sense and preferably also through his auditory sense. The invention also comprises a method of manufacturing such a device and a method of inputting the movement of an object (M) using such a device.

15 Claims, 4 Drawing Sheets

U.S. PATENT DOCUMENTS

Figure 1:
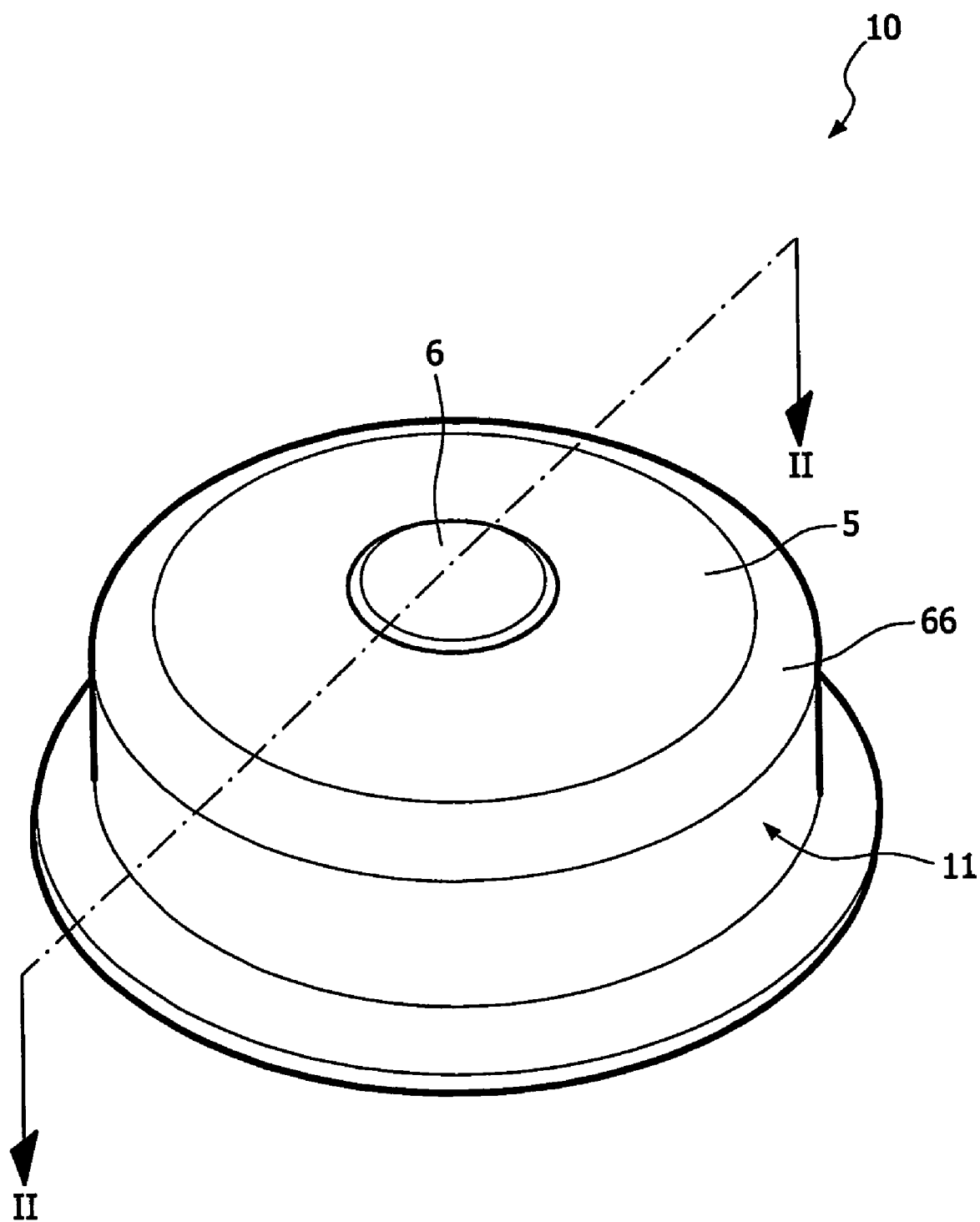

| | | |
|---|---|---|
| 5,943,233 A | 8/1999 | Ebina et al. |
| 6,424,407 B1 | 7/2002 | Kihrot et al. |
| 7,174,026 B2 * | 2/2007 | Niederdrank ............... 381/315 |
| 2002/0104957 A1 * | 8/2002 | Liess et al. ................. 250/221 |
| 2002/0135565 A1 | 9/2002 | Gordon et al. |
| 2003/0235452 A1 * | 12/2003 | Kraus et al. ................. 400/472 |
| 2004/0137929 A1 * | 7/2004 | Jones et al. ................. 455/517 |
| 2008/0284734 A1 * | 11/2008 | Visser ........................ 345/166 |

FOREIGN PATENT DOCUMENTS

| | | |
|---|---|---|
| EP | 0773496 A1 | 5/1997 |
| EP | 1182606 A2 * | 2/2002 |
| JP | 2002014766 A | 1/2002 |
| JP | 2002091689 A | 3/2002 |
| WO | WO9836347 A2 | 8/1999 |
| WO | WO0039663 A1 | 7/2000 |
| WO | WO0106473 A2 | 1/2001 |

* cited by examiner

OPTO-ELECTRONIC INPUT DEVICE, METHOD OF MANUFACTURING SUCH A DEVICE AND METHOD OF MEASURING THE MOVEMENT OF AN OBJECT BY MEANS OF SUCH A DEVICE

The invention relates to an opto-electronic input device, wherein the input is formed by detected movements of an object, which input device is provided with an optical module comprising at least one laser with a resonant cavity for generating a measurement radiation beam, optical means for guiding the radiation beam to a plate close to the object, and conversion means for converting radiation from the measurement radiation beam, which is reflected by the object, into an electric signal, wherein the conversion means are formed by the combination of the resonant cavity of the laser and measurement means for measuring a change in the resonant cavity during operation, which change is caused by interference of the reflected radiation from the measurement radiation beam, which penetrates the resonant cavity, and the standing wave in the resonant cavity, and which is representative of a relative movement of the object with respect to the module, wherein the optical module comprises the laser mounted on a carrier plate, and the optical means comprise an optical component mounted on the carrier plate and aligned with the laser, from which optical component the measurement radiation beam emitted by the laser travels to the plate close to the object.

Such a device is particularly suitable as an input means for a PC, in which case the function of the so-termed mouse can be taken over. In a printer or scanner, movements of the input or output medium can be detected by means of the device. The invention also relates to a method of manufacturing such a device, and to a method of measuring the movement of an object by means of such a device.

A device of the type mentioned in the opening paragraph is known from United States patent specification US 2002/0104957, published on 8 Aug. 2002.

In said document, see FIG. 9a, an input device is shown, wherein, on a carrier plate that takes the form of a foot provided with mounting pins, a laser is mounted such that its resonant cavity is parallel to the carrier plate. Said device comprises three such lasers, which are mounted at angles of 120 degrees with respect to one another (see FIG. 9b).

Around the lasers there is provided a ring-shaped body an inside of which forms a converging mirror guiding a measurement radiation beam emitted by the laser to a window in the cap of the module via a lens. Part of the radiation reflected at a moving object above said window re-enters the resonant cavity of the laser(s). The resonant cavity and measurement means together form conversion means for the reflected radiation, a change occurring in the resonant cavity being representative of a relative movement of the object. The measurement means may be, for example, means for measuring a change of the impedance of the laser's resonant cavity. A radiation detector can also suitably be used for this purpose.

A drawback of the known device resides in that it is insufficiently user-friendly. For example, particularly if the device is small and intended for, for example, a laptop or handheld computer or for a mobile phone, a person using the device makes errors when "clicking or double-clicking" the mouse, in spite of the fact that these actions are excellently detected by such a device.

The object of the known device therefore is to provide a device of the type mentioned in the opening paragraph which is very user-friendly and readily applicable in very small apparatus.

To achieve this, in accordance with the invention, a device of the type mentioned in the opening paragraph is characterized in that the plate comprises, close to the object, a first portion which is situated within a projection of the object and allows passage of the radiation beam and is situated in a fixed position with respect to the carrier plate, as well as a second portion which is situated within a projection of the object and is movable in a direction perpendicular to the carrier plate and comprises signaling means which, in the case of movement in the direction perpendicular to the carrier plate, issue a signal that can be perceived by a user of the device with one of his senses.

The invention is first of all based on the recognition that the known device gives insufficient feedback to a user. Although the device comprises as standard a display device on which the user can monitor the result of his actions, this has often been found insufficient in practice. The invention is further based on the recognition that the tactile sense constitutes a particularly effective form of feedback. A movable part of the plate can provide this feedback, in particular in the case of the above-mentioned clicking actions. The invention is finally based on the recognition that the above-mentioned measures effectively overcome two inherently conflicting requirements, namely that on the one hand, a movable plate is undesirable because, even if it is transparent, it might adversely affect the operation of the opto-electronic device, and, on the other hand, that a rigid plate does not provide feedback to the user.

In a preferred embodiment, the signaling means comprise a press button which springs back after it has been pressed, and which provides an experience for the tactile sense of the user when it is pressed. This proved to be the most user-friendly feedback. Preferably, the press button, upon being pressed, gives an acoustic signal that can be heard by the user. What proved to be particularly suitable for this purpose is a press button comprising a thin, bent membrane of steel. When it is pressed, it makes a clicking sound and springs back well.

In a favorable embodiment of the device in accordance with the invention, the first portion of the plate comprises a round, transparent, block-shaped body which is attached onto the carrier plate, and the press button comprises, in the center thereof, a round opening within which the block-shaped body is situated, the upper face of said block-shaped body being substantially flush with an upper face of the press button, or being situated so much lower as is necessary to enable the press button to be pressed. In this embodiment, the measurement beam is guided to the stationary part of the plate via the transparent block which is situated centrally below, for example, a finger of a user. In this case, the measurement beam may reflect a number of times within the block before the plate and the object situated thereon are reached. A long light path may be necessary for the proper operation of the device.

A further modification is characterized in that the first portion of the plate comprises a ring-shaped transparent block-shaped body which is attached onto the carrier plate, and the press button is situated within the block-shaped body the upper face of which is substantially flush with an upper face of the press button, or is situated so much lower as is necessary to enable the press button to be pressed. Also in this modification, the measurement beam is guided into the transparent block, using for example a reflective element such as a mirror (surface). This modification has the advantage that the measurement beam travels in a spiral-like manner from the block to the plate while being reflected from the walls a number of times. In this case, the light path may be extra long because a ring-shaped part has the largest possible circumference on the outside within the projection of the object.

Preferably the device comprises a laser whose resonant cavity extends parallel to its (largest) surface. Such a laser is inexpensive, easy to mount on the carrier plate, and makes it easy to guide the radiation beam, at a small angle with the carrier plate, into the transparent block-shaped block. Such a small angle makes it easier to lengthen the light path by multiple reflections. Preferably, the measurement means take the form of a radiation detector which is mounted on the carrier plate, and the optical component is mounted, as a mirror face, on a side wall of a cap which is mounted on the carrier plate and which may comprise the block-shaped body.

In a favorable modification, the device comprises a microphone enabling the acoustic signal to be detected. If necessary, the signal may be reproduced after it has been amplified by a build-in (small) loudspeaker. The electric signal of the microphone may also advantageously be used to wake up the device from an energy-saving sleep mode. The device can be put into this sleep mode by means of a build-in hotel circuit which is to be set when the device will be inoperative for some time. The device can thus be very suitably applied in, for example, a wireless, battery-powered computer mouse.

A method of measuring the movement of an object relative to an input device is characterized in accordance with the invention in that for this purpose use is made of an opto-electronic input device as claimed in any one of the preceding claims. Preferably, the moving object is formed by a finger of the user of the device.

A method of manufacturing an opto-electronic input device, wherein the input is formed by detected movements of an object, which input device is provided with an optical module comprising at least one laser with a resonant cavity for generating a measurement radiation beam, optical means for guiding the radiation beam to a plate close to the object, and conversion means for converting radiation from the measurement radiation beam, which is reflected by the object, into an electric signal, wherein the conversion means are formed by the combination of the resonant cavity of the laser and measurement means for measuring a change in the resonant cavity during operation, which change is caused by interference of the reflected radiation from the measurement radiation beam penetrating the resonant cavity and the standing wave in the resonant cavity, which is representative of a relative movement of the object with respect to the module, wherein the optical module is formed by a carrier plate on which the laser is mounted, and the optical means are formed by an optical component, mounted on the carrier plate and aligned with the laser, for the measurement radiation beam emitted by the laser, which measurement radiation beam is guided from said location to the plate close to the object, characterized in that, near the object, the plate is formed in two portions, i.e. a first portion situated within a projection of the object is designed so as to transmit the radiation beam and is arranged in a fixed position with respect to the carrier plate, and a second portion situated within a projection of the object is formed so as to be movable in a direction perpendicular to the carrier plate and is provided with signaling means which, in the case of a movement in a direction perpendicular to the carrier plate, emit a signal that can be perceived by one of the senses of the user of the device. Preferably a press button is used as the signaling means because it is capable of providing feedback to a human user via the tactile sense as well as via the auditory sense.

These and other aspects of the invention are apparent from and will be elucidated with reference to the embodiment(s) described hereinafter.

Figure 2:
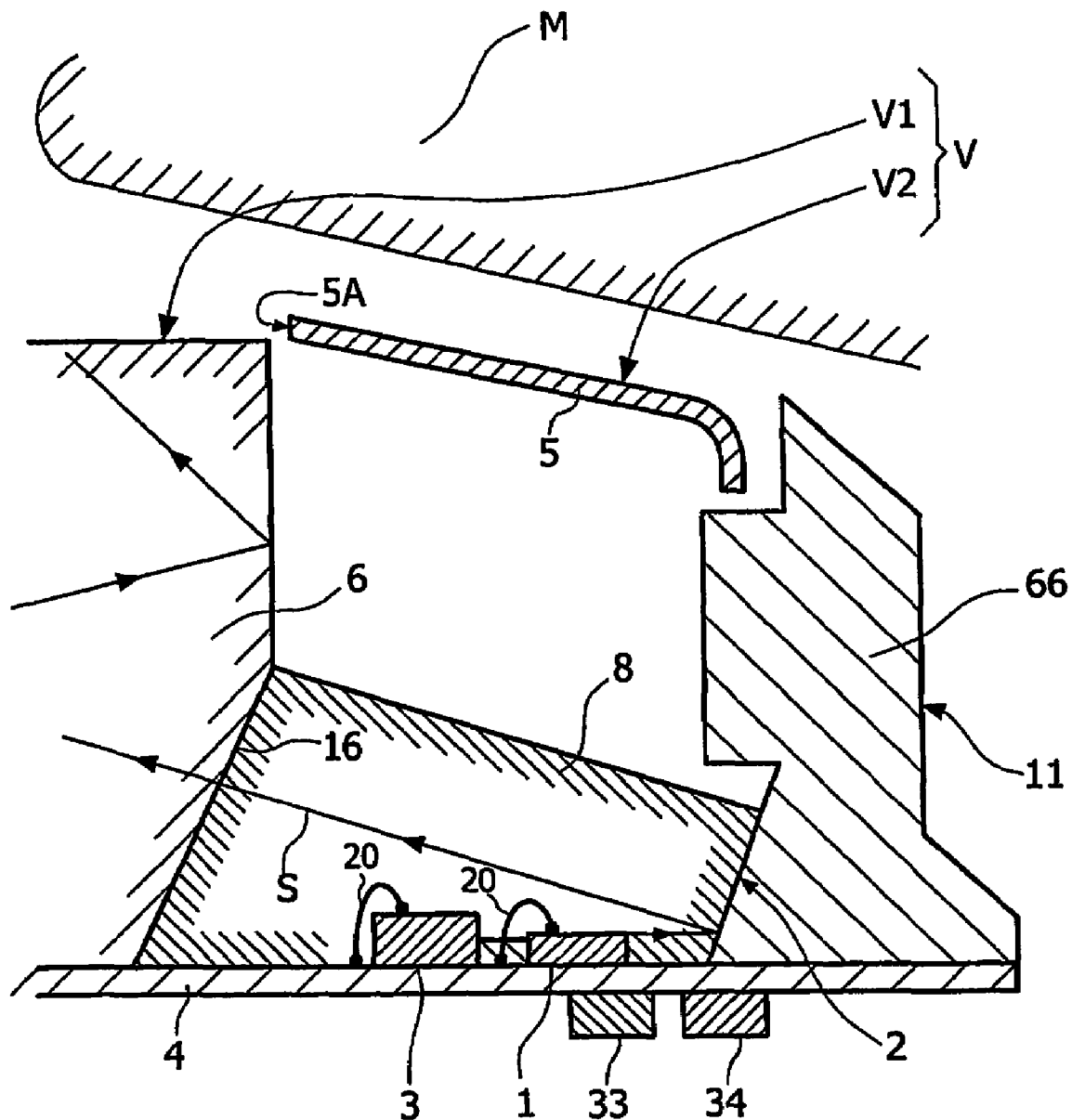
Figure 3:
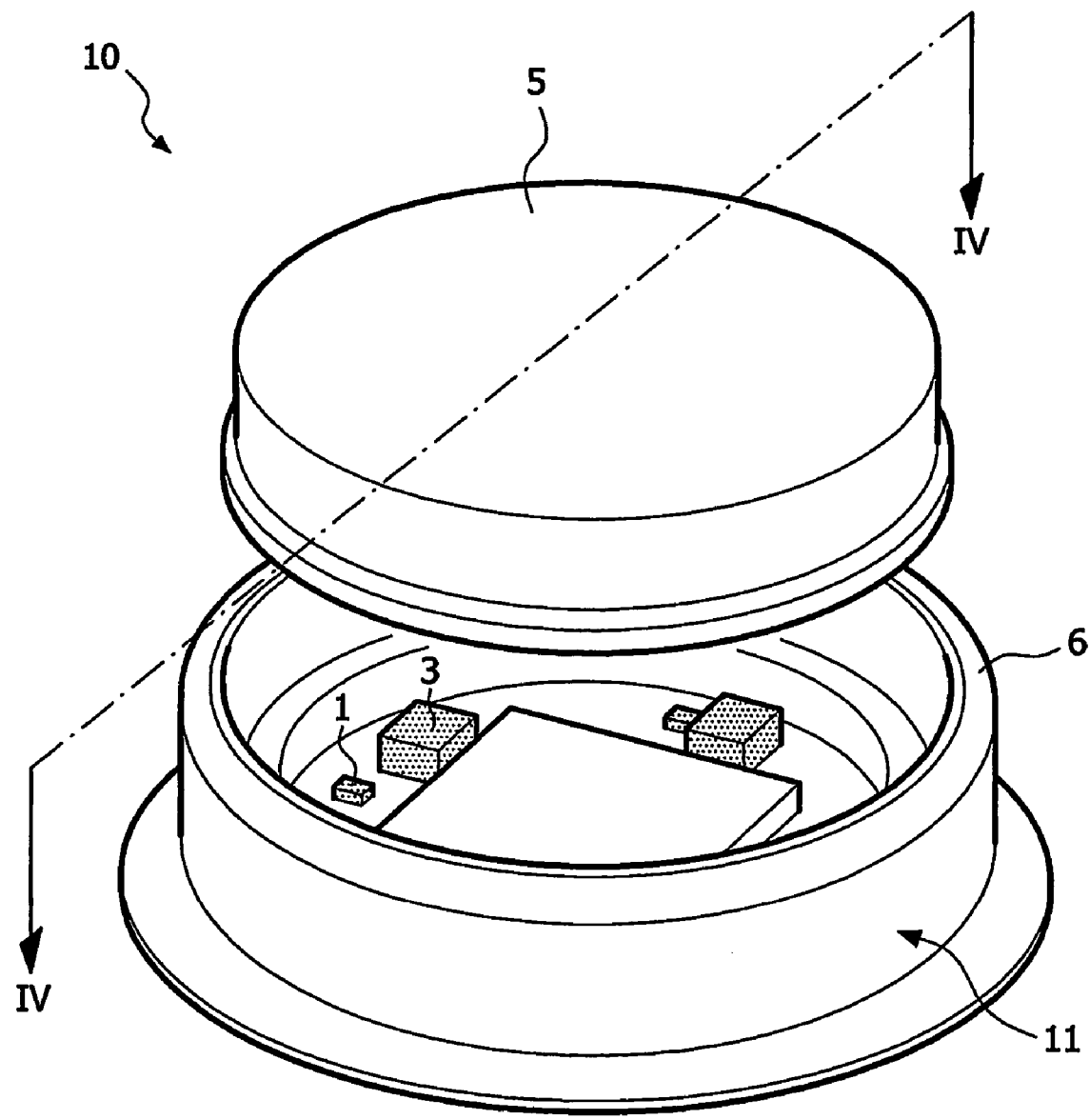
Figure 4:
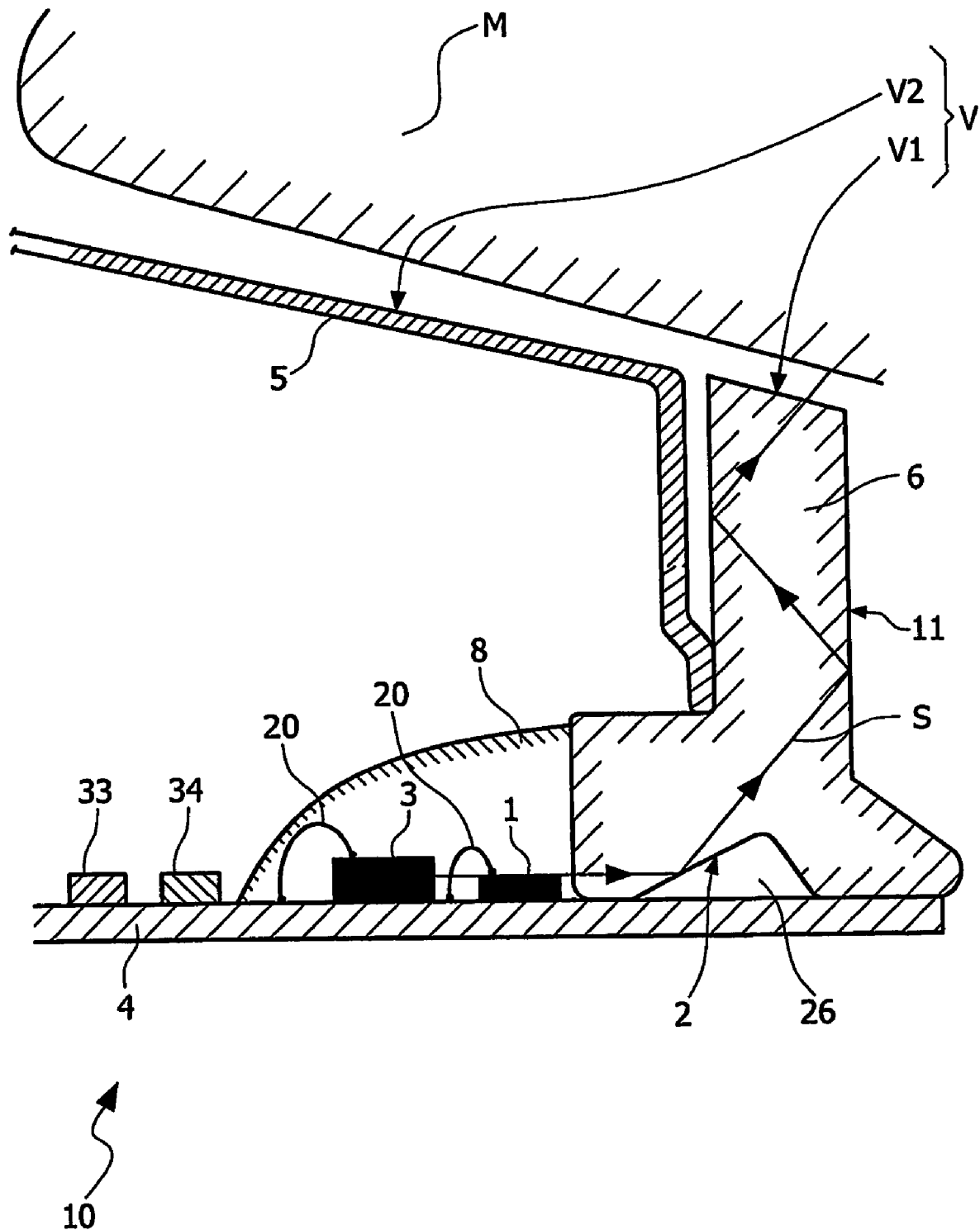

In the drawings:

FIG. 1 is a diagrammatic, perspective view of a first example of an opto-electronic input device in accordance with the invention, FIG. 2 is a diagrammatic, cross-sectional view taken on the line II-II of the device shown in FIG. 1, FIG. 3 is a diagrammatic, perspective view of a second example of an opto-electronic input device in accordance with the invention, and FIG. 4 is a diagrammatic, cross-sectional view taken on the line IV-IV of the device shown in FIG. 3.

The figures are not drawn to scale and some dimensions, such as dimensions in the thickness direction, are exaggerated for clarity. In the various drawings, corresponding areas or parts are indicated by means of the same reference numerals, whenever possible.

FIG. 1 is a diagrammatic, perspective view of a first example of an opto-electronic input device in accordance with the invention, and FIG. 2 is a diagrammatic, cross-sectional view taken on the line II-II. As the cross-sectional view of FIG. 2 is circularly symmetrical, only one half thereof is shown. The input device 10 of this example comprises a module 11 with a carrier plate 4, in this case a PCB (=Printed Circuit Board) 4. On this carrier plate there is a conductor pattern on which a laser 1 and a photodiode 3 are mounted. For the upper connection of the laser 1 and the photodiode 3 use is made of a wire connection 20. On one side of the laser 1 and the photodiode 3 there are optical means 2 in the form of a mirror 2, in this example a flat mirror, which receives a measurement radiation beam S emitted by the laser 1 and sends this beam, in this case at an angle of approximately 30 degrees with respect to the carrier plate (see FIG. 2), to an, in this case round, transparent block-shaped body 6 which, on another side of the laser 1, is situated on the carrier plate 4. Laser 1 and photodiode 3, as well as the entire radiation path S outside the block 6, are situated within a transparent encapsulation 8. In this example, the module 11 comprises a plurality of lasers 1, only one of which is shown in the drawing. Also the parts 2, 3 associated with each laser 1 are present in corresponding numbers.

The block-shaped body 6 is made, in this case entirely, of a transparent synthetic resin, here PMMA. The radiation beam S enters (see FIG. 2) the body 6 and, after a number of internal reflections, reaches the upper face of the plate V. Said plate V comprises, in accordance with the invention, two portions V1, V2, V1 being formed by the fixedly arranged block 6 and V2 being formed by a metal membrane 5 provided with a round hole, said approximately 100 µm thick membrane resting on a ring-shaped block 66, in this case of a non-transparent synthetic resin, and being attached thereto. Both portions V1, V2 are situated within a projection of a moving object M above the plate V, in particular a human finger. As the membrane 5 is detached from and in a slightly higher position than the block 6, it can be pressed with the finger M and thus provide feedback, for example upon clicking or double-clicking, to the user via the tactile sense. Besides, said membrane 5, which takes the form of a press button, emits an acoustic signal when it is pressed, which acoustic signal enhances the feedback via the hearing of the user. After the membrane 5 has been pressed, it springs back to the original position and is ready to be pressed again.

Radiation reflected at the moving finger M reaches the resonant cavity of the laser 1 and elicits a change there as a result of the occurrence of interference produced by the movement. The occurrence of the change in the resonant cavity of the laser 1 is measured, in this example, using a radiation detector 3, in this case a photodiode 3, on which part of the radiation emitted by the laser 1 is incident also. This takes place, for example, by using a further mirror, not shown, which is also situated on block 66. If necessary, the carrier plate 4 may be provided with a cooling member, not shown, for the laser 1. The non-transparent block 66 and the non-transparent press button 5 shield the module 11 against ambient light A side face 16 of the block-shaped body 6 is, in this case, embodied so as to be outwardly inclined in order to counteract reflection of the radiation beam S when it enters the body 6.

The device 10 of this example further comprises, in this case on the lower side of the carrier plate 4, a microphone 33 by means of which the acoustic signal from the membrane 5 can be recorded and, if necessary, amplified via a small loudspeaker 34. In this example, the device 10 forms part of a computer mouse and is provided with a so-termed hotel circuit, not shown, which causes the current supply to most components of the device 10 to be interrupted if the mouse is idle for a certain period of time. As a result, current consumption is low in that situation. Only the microphone 33 and a control circuit, which is not shown in the drawing, are provided with a permanent power supply. An electric signal issued by the microphone 33 when the button 5 is pressed is used, in this example, to turn on the current supply to all necessary components. The device 10 can thus be readily woken up from "sleep mode" by a user without many additional provisions being required for that purpose.

The device 10 of this example is manufactured as follows using a method in accordance with the invention. Taken as a basis is (see for example FIG. 2) a PCB 4 the upper side of which is provided with a conductor pattern for connection of electrically active parts such as the laser 1 and the photodiode 3. In particular for the alignment-sensitive parts, such as the laser 1 and the photodiode 3, but also for the block-shaped bodies 6, 66 solder regions, not shown in the drawing, are provided on the upper side of the plate 4 at predetermined, accurately defined locations. The dimensions of these regions are chosen to be substantially equal to the dimensions of the parts to be placed, such as laser 1, photodiode 3 and the bodies 6, 66. All these parts 1, 3, 6, 66 are provided on the lower side with a metal layer, not shown in the drawing.

Next, the above-mentioned parts 1, 3, 6, 66 are relatively accurately placed on the above-mentioned solder regions using pick-and-place machines. They are attached to the plate 4 during a solder process wherein small deviations of the parts placed are automatically corrected.

In this manner, a sufficiently accurate alignment of the parts 1, 3, 5, 6 of the module 11 with respect to each other is achieved in an easy, fast and inexpensive way. Also the other parts can be mounted in this way. After this surface-mounting of said parts, the necessary additional electric connections of the electrically active parts are made using, for example, wire connections.

Subsequently, if necessary, a droplet of a silicone synthetic resin 8 is provided which covers the laser 1, the photodiode 3 and the mirror 2 and provides them with a radiation-transparent encapsulation 8, within which the entire radiation path S is situated. The electric connections of the electrically active parts 1, 3 that are not shown in the drawing extend to beyond the module 1 and may be situated on top of or below the carrier plate 4. After curing of the encapsulation 8, for example by heating, the press button 5, which either previously or in the course of its manufacture has been provided with a round hole, is placed on the block 66 and attached thereto, for example by means of an adhesive. The device 10 now is ready for use. A large number of devices 10 can be manufactured simultaneously. They can be separated from each other using a separation technique such as sawing. The dimensions of an individual device 10 are approximately 30×30 mm, and the height is not more than approximately 10 mm. The body 6 has a height of 10 mm and a diameter of 5 mm.

FIG. 3 is a diagrammatic, perspective view of a second example of an opto-electronic input device in accordance with the invention, and FIG. 4 is a diagrammatic cross-sectional view taken on the line IV-IV of the device shown in FIG. 3; also in this case only one half thereof is shown. Only the most important differences with the first example will be discussed here. In this example, the portions V1, V2 of the plate V are formed by a transparent, ring-shaped body 6 and a steel membrane 5 which is situated therein, rests thereon and is attached thereto. Also in this case both portions 5, 6 are situated within a projection of the object M, the press button slightly projecting above the ring. This variant has the advantage that the optical path length may be very long, particularly if the radiation beam S moves spirally through the block 6, which large optical path length may have a favorable effect on the proper operation of the opto-electronic detection of movement of object M. Further advantages are that the module 11 comprises comparatively few parts and that the press button 5 does not have to be provided with a hole and hence functions both better and longer. In this example, the radiation beam S enters the block 6 at a right angle. At the lower side of said block, an air-filled cavity 26 is formed as a result of which the block 6 is provided with an internal mirror 2 via which the beam S can reach, after multiple reflections against the side walls of the block 6, the upper surface thereof. The outer sides of the block may, in connection with this, be provided with a reflective, non-transparent coating, if necessary. The module may thus also be shielded from ambient radiation. The manufacture of the device 10 of this example takes place in a manner similar to that described with respect to the first example.

The invention is not limited to the examples described above, and within the scope of the invention many variations and modifications are possible to those skilled in the art. For example, devices may be manufactured which have a different geometry and/or different dimensions. Also a device having only a single laser 1 with the associated parts can be advantageously applied. Instead of a PCB substrate use can also be made of a substrate of glass or ceramics.

It is further noted that the device may comprise further active and passive semiconductor elements or electronic components such as diodes and/or transistors and resistors and/or capacitors, whether or not in the form of an integrated circuit. The manufacture is of course efficiently adapted thereto. The relevant change in the resonant cavity of a laser may thus also be determined in a solely electrical way. Also included herein is the addition of a processor or other electronics for reading and/or controlling the laser.

It is finally noted that although the invention is intended for use particularly in the case of a human user, the user could alternatively be, for example, an animal. The user may even comprise a machine or apparatus, for example in the form of a robot.

The invention claimed is:

1. An opto-electronic input device, wherein the input is formed by detected movements of an object (M), which input device is provided with an optical module comprising at least one laser with a resonant cavity for generating a measurement radiation beam (S), optical means for guiding the radiation beam (S) to a plate (V) close to the object (M), and conversion means for converting radiation from the measurement radiation beam (S), which is reflected by the object (M), into an electric signal, wherein the conversion means are formed by the combination of the resonant cavity of the laser and measurement means for measuring a change in the resonant cavity during operation, which change is caused by interference of the reflected radiation from the measurement radiation beam (S), which penetrates the resonant cavity, and the standing wave in the resonant cavity, and which is representative of a relative movement of the object (M) with respect to the module, wherein the optical module comprises the laser mounted on a carrier plate, and the optical means comprise an optical component mounted on the carrier plate and aligned with the laser, from which optical component the measurement radiation beam (S) emitted by the laser travels to the plate (V) close to the object (M), wherein the plate (V) comprises, close to the object (M), a first portion (V1) that comprises an upper surface of a transparent block-shaped body which is situated within a projection of the object (M), wherein the transparent block-shaped body (i) is configured to enable passage of the radiation beam (S) upon entering near a lower sidewall and through multiple internal reflections against sidewalls of the transparent block-shaped body to the upper surface of the transparent block-shaped body and (ii) is situated in a fixed position with respect to the carrier plate in that the transparent block-shaped body is mounted onto the carrier plate, as well as a second portion (V2) which is situated within a projection of the object (M) and is movable in a direction perpendicular to the carrier plate, wherein the second portion (V2) comprises signaling means which, in response to movement of the second portion (V2) in the direction perpendicular to the carrier plate, is configured to issue a signal that can be perceived by a user of the device with one of his senses.

2. An opto-electronic device as claimed in claim 1, wherein the signaling means comprise a press button which springs back after the press button has been pressed, and which provides an experience for the tactile sense of the user when the press button is pressed.

3. An opto-electronic device as claimed in claim 2, wherein the press button, upon being pressed, emits an acoustic signal that can be heard by the user.

4. An opto-electronic device as claimed in claim 2, wherein the press button comprises a thin, bent membrane of steel.

5. An opto-electronic device as claimed in claim 3, further comprising:
a microphone configured to convert the acoustic signal of the press button to an electric signal.

6. An opto-electronic device as claimed in claim 5, wherein the electric signal is used to wake up the device from an energy-saving sleep mode.

7. An opto-electronic device as claimed in claim 2, wherein the transparent block-shaped body of the first portion of the plate (V1) comprises a round, transparent, block-shaped body which is attached onto the carrier plate, and the press button comprises, in the center thereof, a round opening within which the round, transparent, block-shaped body is situated, the upper face of said block-shaped body being substantially flush with an upper face of the press button, or being situated lower by an amount necessary to enable the press button to be pressed.

8. An opto-electronic device as claimed in claim 2, wherein the transparent block-shaped body of the first portion of the plate (V1) comprises a ring-shaped, transparent, block-shaped body which is attached onto the carrier plate, and the press button is situated within the ring-shaped, transparent, block-shaped body the upper face of which is substantially flush with an upper face of the press button.

9. An opto-electronic device as claimed in claim 7, wherein, near the lower sidewall of the transparent block-shaped body, the measurement radiation beam (S) is introduced into said transparent block-shaped body at an angle such that the measurement radiation beam (S) moves spirally to the upper surface of the transparent block-shaped body.

10. An opto-electronic device as claimed in claim 1, wherein the dimensions of the first and second portions (V1, V2) of the plate are suitable for an object (M) that is formed by a human finger.

11. An opto-electronic device as claimed in claim 1, wherein the laser is attached onto the carrier plate in such a manner that the resonant cavity of the laser is parallel to said carrier plate.

12. A method of measuring the movement of an object (M) relative to an input device, wherein for this purpose use is made of an opto-electronic input device as claimed in claim 1.

13. A method as claimed in claim 12, wherein the object (M) is formed by a finger of a human user of the device.

14. A method of manufacturing an opto-electronic input device, wherein the input is formed by detected movements of an object (M), which input device is provided with an optical module comprising at least one laser with a resonant cavity for generating a measurement radiation beam (S), optical means for guiding the radiation beam (S) to a plate (V) close to the object (M), and conversion means for converting radiation from the measurement radiation beam (S), which is reflected by the object (M), into an electric signal, wherein the conversion means are formed by the combination of the resonant cavity of the laser and measurement means for measuring a change in the resonant cavity during operation, which change is caused by interference of the reflected radiation from the measurement radiation beam (S) penetrating the resonant cavity and the standing wave in the resonant cavity, which is representative of a relative movement of the object (M) with respect to the module, wherein the optical module is formed by a carrier plate on which the laser is mounted, and the optical means are formed by an optical component, mounted on the carrier plate and aligned with the laser, for the measurement radiation beam (S) emitted by the laser, which measurement radiation beam is guided from said location to the plate (V) close to the object (M), wherein, near the object (M), the plate (V) is formed in two portions (V1, V2), including a first portion (V1) that comprises an upper surface of a transparent block-shaped body situated within a projection of the object (M), wherein the transparent block-shaped body (i) is designed so as to transmit the radiation beam (S) upon entering near a lower sidewall and through multiple internal reflections against sidewalls of the transparent block-shaped body to the upper surface of the transparent block-shaped body and (ii) is arranged in a fixed position with respect to the carrier plate in that the transparent block-shaped body is mounted onto the carrier plate, and a second portion (V2) situated within a projection of the object (M) is formed so as to be movable in a direction perpendicular to the carrier plate, wherein the second portion (V2) comprises signaling means which, in response to movement of the second portion (V2) in a direction perpendicular to the carrier plate, is configured to emit a signal that can be perceived by one of the senses of the user of the device.

15. An opto-electronic device as claimed in claim 8, wherein, near the lower sidewall of the transparent block-shaped body, the measurement radiation beam (S) is introduced into said transparent block-shaped body at an angle such that the measurement radiation beam (S) moves spirally to the upper surface of the transparent block-shaped body.

* * * * *